United States Patent
Chen et al.

(10) Patent No.: US 9,799,094 B1
(45) Date of Patent: Oct. 24, 2017

(54) PER-INSTANCE PREAMBLE FOR GRAPHICS PROCESSING

(71) Applicant: QUALCOMM Incorporated, San Diego, CA (US)

(72) Inventors: Lin Chen, San Diego, CA (US); Richard Hammerstone, Tyngsboro, MA (US); Jiaji Liu, San Diego, CA (US); Chihong Zhang, San Diego, CA (US); Andrew Evan Gruber, Arlington, MA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 15/162,198

(22) Filed: May 23, 2016

(51) Int. Cl.
  *G06T 1/60* (2006.01)
  *G06T 1/20* (2006.01)
  *G06T 15/00* (2011.01)
  *G06T 9/00* (2006.01)

(52) U.S. Cl.
  CPC .................. *G06T 1/60* (2013.01); *G06T 1/20* (2013.01); *G06T 9/00* (2013.01); *G06T 15/005* (2013.01)

(58) Field of Classification Search
  CPC .... G06T 1/60; G06T 9/00; G06T 1/20; G06T 15/005
  See application file for complete search history.

(56) References Cited

U.S. PATENT DOCUMENTS

| 7,164,427 B2 | 1/2007 | Doyle et al. |
| 9,123,167 B2 | 9/2015 | Li et al. |
| 2006/0170680 A1 | 8/2006 | Peeper et al. |
| 2010/0164983 A1 | 7/2010 | Lawrence et al. |
| 2014/0022266 A1 | 1/2014 | Metz et al. |
| 2014/0354669 A1 | 12/2014 | Galazin et al. |
| 2014/0362102 A1 | 12/2014 | Cerny et al. |
| 2014/0372703 A1 | 12/2014 | Ricketts et al. |
| 2015/0348222 A1 | 12/2015 | Surti et al. |

OTHER PUBLICATIONS

U.S. Appl. No. 15/162,272, filed by Lin Chen, on May 23, 2016.
"Anonymous: "glDrawElementsInstanced", Jan. 1, 2014, XP055385146, Retrieved from the Internet: URL:https://www.khronos.org/registry/OpenGL-Refpages/gl4/html/glDrawElementsInstanced.xhtml [retrieved on Jun. 26, 2017], 2 pages."

(Continued)

*Primary Examiner* — Maurice L McDowell, Jr.
(74) *Attorney, Agent, or Firm* — Shumaker & Sieffert, P.A.

(57) ABSTRACT

A method for processing data in a graphics processing unit (GPU) including receiving an instance identifier for an instance and a shader program comprising a preamble code block and a main shader code block, assigning, the instance identifier to a general purpose register at wave creation, allocating address space within the constant memory for instance uniforms, and determining the preamble code block has not been executed and the wave is a first wave of the instance to be executed, based on determining the preamble code block has not been executed and the wave is the first wave to be executed, executing the preamble code block to store the plurality of instance uniforms in the constant memory and based, at least in part, on executing the preamble code block, executing the wave of the plurality of waves using at least one of the plurality of instance constants stored inconstant memory.

30 Claims, 5 Drawing Sheets

(56) References Cited

OTHER PUBLICATIONS

Anonymous: "Vertex Rendering—OpenGL Wiki", Jan. 24, 2016, XP055374109, Retrieved from the Internet: URL:https://www.khronos.org/opengl/wiki/Vertex Rendering [retrieved on May 18, 2017], 13 pages.
International Search Report and Written Opinion—PCT/US2017/026842 dated Jul. 12, 2017, 18 pages.
Ivson P., et al., "Instanced Rendering of Massive CAD Models Using Shape Matching", 27th SIBGRAPI Conference on Graphics, Patterns and Images, IEEE, Aug. 26, 2014, pp. 335-342, XP032653541, DOI: 10.1109/SIBGRAPI.2014.34.
International Search Report and Written Opinion—PCT/US2017/026835—dated Jul. 4, 2017 14 pages.

```
per_instance_preamble_start   shader_code
...
        // ugpr holding instance offset is available after
        //the new instance event is handled
        for (i = 0; i < FOOTPRINT; i++){
                src = instance_id * FOOTPRINT + i;
                dst = ugpr + i;
                ldck dst, src;
        }
...
        end_preamble;

shader_code:
...
        // ugpr holding instance offset is already assigned
        //calculate offset relative to the instance start
        read constantRAM[ugpr+offset];
...
```

PER-INSTANCE PREAMBLE FOR GRAPHICS PROCESSING

TECHNICAL FIELD

The disclosure relates to data processing and, more particularly, to generation and execution of a per-instance preamble for graphics processing.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading. A SIMD processing system allows multiple threads of execution for a program to execute synchronously on the multiple processing elements in a parallel manner, thereby increasing the throughput for programs where the same set of operations needs to be performed on multiple pieces of data. A particular instruction executing on a particular SIMD processing element is referred to as a thread or a fiber. A group of threads may be referred to as a wave or warp.

Processing units, such as GPUs, include processing elements and general purpose registers (GPRs) and uniform GPRs (uGPRs) that store data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). A shader is a computer program that can utilize a parallel processing environment (e.g., shader processors) and have been used to perform graphics rendering techniques on two and three-dimensional models at various stages of the graphics processing pipeline. Examples of shaders include pixel (or fragment) shaders, used to compute color and other attributes of a pixel (or fragment); vertex shaders, used to control position, movement, lighting, and color, or a vertex; geometry shaders, used to generate graphics primitives; tessellation-related shaders (e.g., hull shaders and/or domain shaders that are used when subdividing patches of vertex data into smaller primitives, and compute shaders are used for computing other information, e.g., non-graphics data).

SUMMARY

In general, this disclosure describes techniques for using per-instance preambles to increase memory efficiency. In particular, this disclosure describes techniques whereby the shader system may allocate a section of constant RAM for an instance. At wave creation time, an instance offset may be allocated in a scalar GPR. The shader system then allocates a section of the constant RAM for instance specific information (e.g., position information, texture information), via e.g., a wrap-around ring buffer. Information common to all instances may be stored in a separate area of constant RAM. This may allow the graphical processing unit (GPU) to reuse data loaded from memory many times (e.g., the common information), and only load the per-instance shader information. This may reduce the need to increase the amount of on-chip RAM, reduce memory traffic, increases performance, and reduces power consumption as there may be a reduction of traffic on the bus.

In one example of this disclosure, a method of operating a graphic processing unit (GPU), the method comprising: receiving, by the GPU from a shader compiler, an instance identifier for an instance and a shader program, the shader program comprising a preamble code block and a main shader code block, the preamble code block being executable to store a plurality of instance uniforms in a constant memory; assigning, by the GPU, the instance identifier to a general purpose register at a creation of a wave of a plurality of waves; allocating, by the GPU, address space within the constant memory for the plurality of instance uniforms; determining, by the GPU, the preamble code block has not been executed and the wave is a first wave of the instance to be executed; based, at least in part, on determining the preamble code block has not been executed and the wave is the first wave to be executed, executing, by the GPU, the preamble code block to store the plurality of instance uniforms in the constant memory; and based, at least in part, on executing the preamble code block, executing, by the GPU, the main shader code block for the wave of the plurality of waves using at least one of the plurality of instance constants stored in the constant memory.

In another example, a device for processing data, the device comprising: a graphics processing unit (GPU), the GPU comprising a constant memory and a shader core, the shader core comprising a control unit, a plurality of processing elements, and a general purpose register (GPR), wherein the control unit is configured to: receive, from a shader compiler, an instance identifier for an instance and a shader program, the shader program comprising a preamble code block and a main shader code block, the preamble code block being executable to store a plurality of instance uniforms in the constant memory; assign the instance identifier to the GPR at a creation of a wave of a plurality of waves; allocate address space within the constant memory for the plurality of instance uniforms; determine the preamble code block has not been executed and the wave is a first wave of the instance to be executed; based, at least in part, on the determination that the preamble code block has not been executed and the wave is the first wave to be executed, direct at least one of the plurality of processing elements to execute the preamble code block to store the plurality of instance uniforms in the constant memory; and based, at least in part, on the execution of the preamble code block, direct at least one of the plurality of processing elements to execute the main shader code block for the wave of the plurality of waves using at least one of the plurality of instance constants stored in the constant memory.

In another example, an apparatus configured to operate a graphic processing unit (GPU), the apparatus comprising: means for receiving, from a shader compiler, an instance identifier for an instance and a shader program, the shader program comprising a preamble code block and a main shader code block, the preamble code block being executable to store a plurality of instance uniforms in a constant memory; means for assigning the instance identifier to a general purpose register at a creation of a wave of a plurality of waves; means for allocating address space within the constant memory for the plurality of instance uniforms; means for determining the preamble code block has not been executed and the wave is a first wave of the instance to be executed; means for executing the preamble code block to store the plurality of instance uniforms in the constant memory based, at least in part, on determining the preamble code block has not been executed and the wave is the first wave to be executed; and means for executing the main shader code block for the wave of the plurality of waves using at least one of the plurality of instance constants stored in the constant memory based, at least in part, on the executing the preamble code block.

In another example, a non-transitory computer-readable storage medium including instructions stored thereon that, when executed, cause at least one processor of to: receive, from a shader compiler, an instance identifier for an instance and a shader program, the shader program comprising a preamble code block and a main shader code block, the preamble code block being executable to store a plurality of instance uniforms in the constant memory; assign the instance identifier to a general purpose register (GPR) at a creation of a wave of a plurality of waves; allocate address space within the constant memory for the plurality of instance uniforms; determine the preamble code block has not been executed and the wave is a first wave of the instance to be executed; based, at least in part, on the determination that the preamble code block has not been executed and the wave is the first wave to be executed, direct at least one of the plurality of processing elements to execute the preamble code block to store the plurality of instance uniforms in the constant memory; and based, at least in part, on the execution of the preamble code block, direct at least one of the plurality of processing elements to execute the main shader code block for the wave of the plurality of waves using at least one of the plurality of instance constants stored in the constant memory.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating an example a set of instructions.

DETAILED DESCRIPTION

Figure 1:
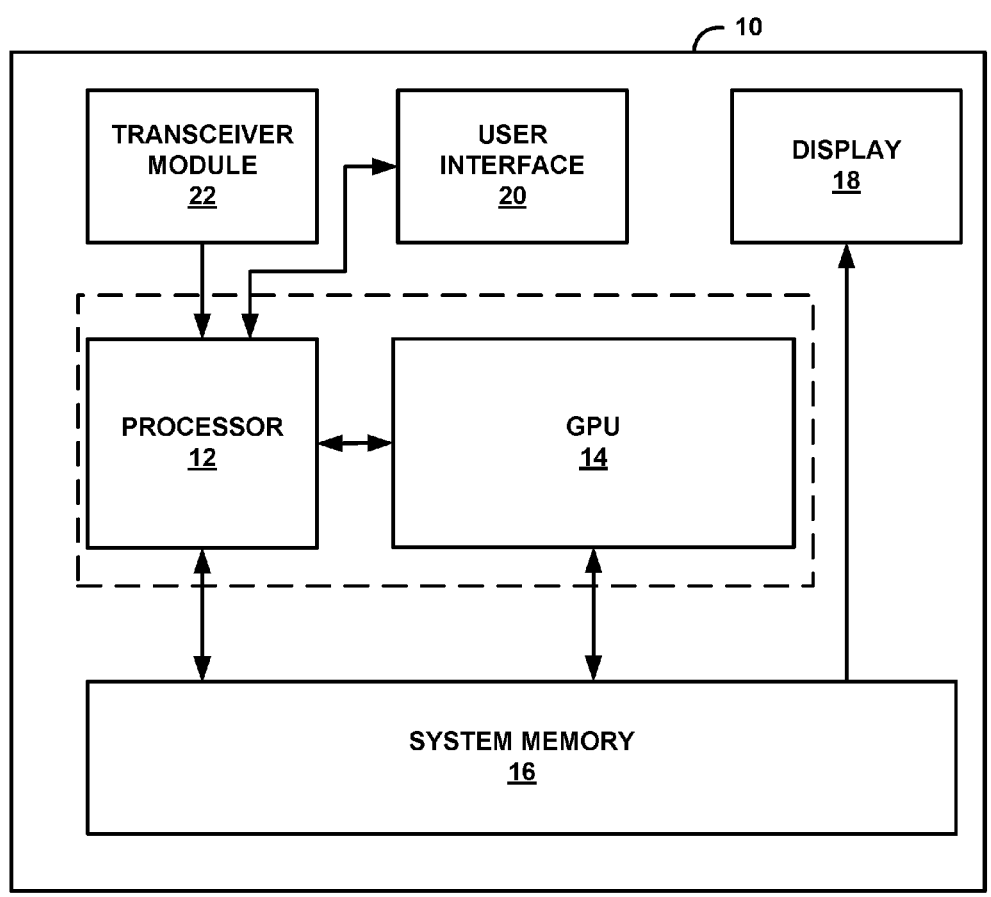
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time or substantially the same time), include one or more processor cores (e.g., shader cores for a GPU) that execute instructions of one or more programs. For ease of description, the techniques described in the disclosure are described with respect to a GPU configured to perform graphics processing applications and/ or general purpose GPU (GPGPU) applications. However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core (or more generally a SIMD processing core) includes a plurality of SIMD processing elements, where each SIMD processing element executes instructions of the same program, but on different data. A particular instruction executing on a particular SIMD processing element is referred to as a thread or a fiber. A group of threads that are executed concurrently may be referred to as a wave or warp. All of the processing elements together that execute a wave may be referred to as a vector processing unit, where each lane (e.g., processing element) of the vector executes one thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

A shader (or shader program) is a computer program that can utilize a parallel processing environment (e.g., shader processors). Example commands in a shader program may include a draw command and a dispatch command. A draw command refers to one or more of a family of commands executed by a processing unit (e.g. a CPU) to a graphics application program interface (API) which interacts with a graphical processing unit (e.g. GPU) to draw (e.g. render) an object for display on a display device. A dispatch command refers to a one or more of a family of commands executed by a processing unit (e.g. a CPU) to a graphics API which interacts with a graphics processing unit (GPU) to execute non-display operations. A graphics API may also have shader-instance-specific draw commands. These shader-instance-specific draw commands may mirror non-instance draw commands expect may allow a processor to make a single draw call and having a GPU process the command for each instance of, for example, a mesh instance. An instance is a single occurrence of a model or object to be rendered. Instancing is a technique where many objects (e.g., multiple copies of the same mesh) may be drawn at once with a single render call. The use of instancing may save CPU to GPU communications each time an object is rendered. Elements of a draw or dispatch command may execute redundant operations in an associated shader. In particular, a GPU may perform batch processing commands such as draw calls and dispatches. A command may instruct the GPU to use one or more shaders to process elements such as work items, pixels, and vertices. A shader may then be invoked for the element. The same shader may be invoked for the command's elements of the same type. An operation of the shader may produce the same result for all elements of the same type. Such operations may be identified and executed a single time without the need to redundantly execute the same code segment for each element.

Games and benchmarks may create many copies of certain elements in a scene. These elements may be represented by a single piece of geometry (e.g., a mesh) and a set of attributes specific to the application. Instanced rendering draws the same geometry multiple times, with each instance's attributes used to control where and how the element appears. For example, trees, grass, and buildings are frequently rendered using geometry instancing and GFX-Bench 3.0 graphics benchmark utilizes a Manhattan test that renders lights as instanced draw calls.

Large uniform buffer objects (UBOs) are needed to support a large number of instanced draw calls. Frequently, UBOs may be larger than an on-chip (e.g., on GPU) constant store which necessitates moving data from the on-chip constant store to other, frequently slower, memory. This may cause increased memory traffic, reduced performance, and increased power consumption.

This disclosure describes methods, techniques, and devices whereby targeted per-instance uniforms are loaded into constant RAM at shader runtime. A uniform is a data type that act as parameters that can be passed, by a GPU driver running on a CPU, of a shader program can pass to the shader program running on a GPU. Uniforms may not change value from one execution of a shader program to the next within a particular rendering call. Uniforms, thus, may be implicitly constant within the shader. In one example of the disclosure, when a draw command (of, e.g., an instanced draw call) is executed, a shader compiler/GPU driver passes an instance identifier (ID) to the shader processor (also referred to as the shader core). The CPU (via the shader compiler and/or GPU driver) may send to the GPU state information about the instance (including e.g., memory requirements for constants). The shader processor may use the instance ID to locate (e.g., calculate the address of) the constants (also referred to as uniforms and instance constants) in the uniform buffer objects (UBOs) in the system memory that are used by the pixels (or vertices) of the instance. UBOs are buffer objects (i.e., objects that store an array of unformatted memory allocated by the GPU) used to store uniform data for a shader program and may be used to share uniforms between different programs. The CPU may generate shader code for execution on the shader processor. The code generated may include a per-instance shader preamble and main shader code. The per-instance shader preamble may enable the shader processor to allocate memory for instance constants for use by different groups of threads (also referred to as a wave or warp) to execute main shader code. The per-instance shader preamble may be executed once prior to the execution of any wave of the instance. The per-instance shader preamble may be executed once per instance. An instanced draw can have many instances, so the per-instance preamble may be executed many times during the execution of a draw call. However, the per-instance preamble may be called only once per instance although an instance may have many waves. Per-instance preambles may be used for each shader type of a draw call. For example, a vertex shader and a fragment shader may each have a separate per-instance shader preamble execution on a particular instance.

Main shader code may have access to instance constants via accessing a uGPR containing a location (e.g., memory address) of instance constants. The location may include a location in a wrap-around ring buffer. The wrap-around ring buffer may be located in constant RAM. The location may include an instance specific memory offset allocated prior to the execution of any wave. At the execution of a subsequent wave, uGPRs may be reset. A uGPR may be reloaded with the current instance offset. This may allow the subsequent wave to access the memory locations of the instance constants without having to reload each piece of data (as the UGPRs reset after each wave).

During execution of the subsequent wave, the shader executing the shader program may skip (via e.g., a branch operation) over the shader preamble. The skip may occur after a check to see whether a flag was set to denote that the per-instance shader preamble has previously completed execution. The skip may also occur after a check to see whether the current wave is the first wave of the instance (which would fail in a subsequent wave execution). Because uniforms may be loaded only once per instance (into e.g., the wrap-around ring buffer in constant RAM) and reuse the uniforms for many pixels (or vertices) of the instance, reusing (and not reloading) the data from UBOs multiple times may increase performance and reduce power consumption of the system.

FIG. 1 is a block diagram illustrating an example device for processing data in accordance with one or more example techniques described in this disclosure of per-instance preambles. FIG. 1 illustrates device 10, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, and the like.

In the example of FIG. 1, device 10 includes processor 12, GPU 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (e.g., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the CPU of device 10. In some examples, GPU 14 may be specialized hardware that includes integrated and/or discrete logic circuitry that provides GPU 14 with massive parallel processing capabilities suitable for graphics processing (e.g., a SIMD processor). In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce an instanced draw of a mesh of vertices of primitives, where the interconnection of primitives at respective vertices forms a graphical object. In this example, the graphics data that processor 12 produces are the attribute data for the attributes of the instance mesh of vertices. For example, the application executing on processor 12 may generate color values, opacity values, coordinates, etc. for each of the instance mesh of vertices, which are all examples of attributes of the vertices. Through the use of a per-instance shader preamble, these attributes may be loaded into constant RAM on GPU 14 a single time at the execution of the per-instance shader preamble. The attributes may be utilized by a shader in subsequent waves without reloading all of the values. Instead, an instance offset may be reloaded at each wave into a uniform general purpose register on GPU 14. This instance offset may allow GPU 14 to locate and utilize the attributes in the subsequent wave.

Processor 12 (via, e.g., a driver) may pass the attributes to GPU 14 via a UBO. Attributes passed from system memory 16 to the GPU 14 via the UBO may include attributes from a large number of instances. A UBO in system memory 16 may be larger than an amount of space allocated on GPU 14. An instance identifier may be passed from processor 12 to GPU 14 via hardware state variables. Processor 12 (via, e.g., a compiler) may compose a per-instance shader preamble to, when executed on GPU 14, load and store the attributes from the UBO to a section of constant RAM. In one example, the section of constant RAM may be implemented as a wrap-around ring buffer. In a second example, the section of constant RAM may be implemented as a linked list. Because the UBO in system memory 16 may be larger than the amount of allocated memory on GPU 14, only current instance specific uniforms may be copied into memory resident on the GPU 14. The instance specific uniforms may be identified in the UBO via the instance identifier passed from processor 12 to GPU 14.

In general, the techniques of this disclosure are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations. Such operations may require the use of multiple waves of a shader. Data may be stored in constant RAM and retrieved via a pointer in a GPR. The pointer in the GPR may be refreshed after each wave after the GPRs get reset. This may allow this data to be accessed persistently without requiring the reloading of the data between waves.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, tessellation-related shaders, a compute shader, etc.) that execute on a shader core (also referred to as a shader processor or kernel) of GPU 14.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item. For non-graphics related applications, the term "work item" may refer to smallest unit on which GPU 14 performs processing.

Figure 2:
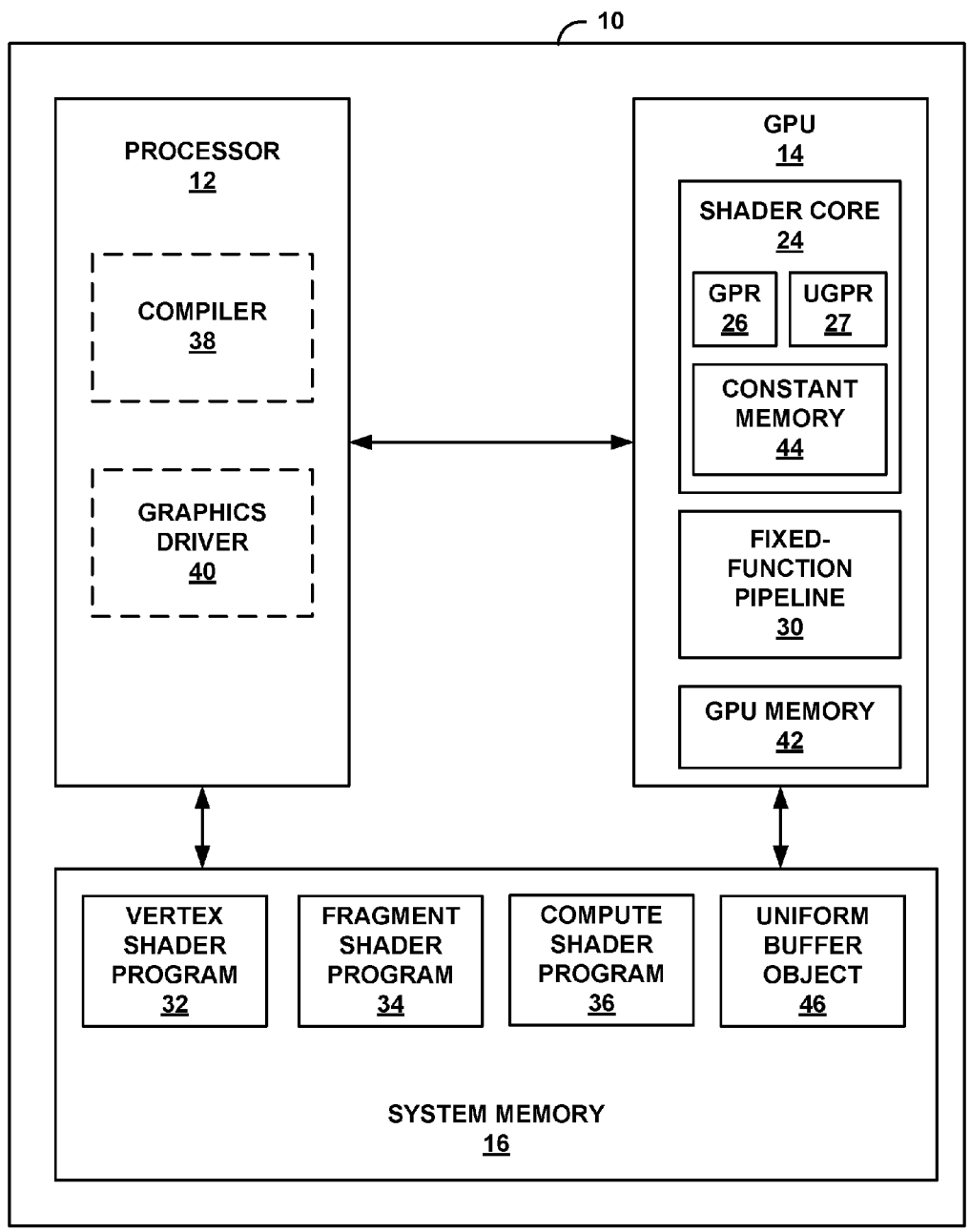
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes shader core 24, which includes general purpose registers (GPRs) 26, uniform GPRs (uGPR) 27, and constant memory 44, fixed-function pipeline(s) 30, and GPU Memory 42. GPR 26 may include a single GPR, a GPR file, and/or a GPR bank. uGPR 27 may include a single uGPR, a uGPR file, and/or a uGPR bank. GPR 26 may store data accessible to a single thread/fiber. uGPR 27 may store data accessible by all threads/fibers in a single wave/warp. Shader core 24 and fixed-function pipeline(s) 30 may together form a processing pipeline used to perform graphics or non-graphics related functions. The processing pipeline performs functions as defined by software or firmware executing on GPU 14 and performs functions by fixed-function units that are hardwired to perform specific functions. Such fixed-function pipelines 30 of GPU 14 may include a texture pipeline, a tessellation stage, clipping that fall outside the viewing frustum, and lighting.

The software and/or firmware executing on GPU 14 may be referred to as shader programs (or simply shaders), and the shader programs may execute on shader core 24 of GPU 14. Although only one shader core 24 is illustrated, in some examples, GPU 14 may include two or more shader cores similar to shader core 24. Fixed-function pipeline(s) 30 includes the fixed-function units. Shader core 24 and fixed-function pipeline(s) 30 may transmit and receive data from one another. For instance, the processing pipeline may include shader programs executing on shader core 24 that receive data from a fixed-function unit of fixed-function pipeline 30 and output processed data to another fixed-function unit of fixed-function pipeline 30.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader program 32, fragment shader program 34, and compute shader program 36. Vertex shader program 32 and fragment shader program 34 may be shader programs for graphics related tasks, and compute shader program 36 may be a shader program for a non-graphics related task. There are additional examples of shader programs such as geometry shaders and tessellation-related shaders, which are not described for purposes of brevity.

Graphics driver 40 executing on processor 12 may be configured to implement an application programming interface (API); although graphics driver 40 does not need to be limited to being configured in accordance with a particular API. In such examples, the shader programs (e.g., vertex shader program 32, fragment shader program 34, and compute shader program 36) may be configured in accordance with a API supported by graphics driver 40. In an example where device 10 is a mobile device, graphics driver 40 may be configured in accordance with the OpenGL ES API. The OpenGL ES API is specifically designed for mobile devices. In an example where device 10 is a non-mobile device, graphics driver 40 may be configured in accordance with the OpenGL API. Other example APIs include the DirectX family of APIs by the Microsoft Corporation. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute vertex shader program 32 and fragment shader program 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14.

In some examples, system memory 16 may store the source code for one or more of vertex shader program 32, fragment shader program 34, and compute shader program 36. In these examples, compiler 38 executing on processor 12 may compile the source code of these shader programs to create object or intermediate code executable by shader core 24 of GPU 14 during runtime (e.g., at the time when these shader programs are to be executed on shader core 24). In some examples, compiler 38 may pre-compile the shader programs and store the object or intermediate code of the shader programs in system memory 16.

System memory 16 may also store one or more uniform values in uniform buffer object (UBO) 46. UBO 46 may store uniform data for one or more instances. These values may be passed from system memory 16 to memory on GPU 14 (e.g., constant memory 44 and/or GPU memory 42).

In accordance with the techniques of this disclosure, compiler 38 (or in another example graphics driver 40) running on processor 12 may build a shader into multiple components including a "main" shader component and a "per-instance preamble" shader component. Compiler 38 may receive code to compile from a program executing on processor 12 into, for example, the "main" shader component. Compiler 38 may also use information about the state of an instance (e.g., instance identifier, number of uniforms used for the instance, size of memory used by the instance uniforms) to write a per-instance shader preamble. The per-instance shader preamble may, when executed by GPU 14 (or shader core 24), to load the instance uniforms into constant memory 44. The instance uniforms may, in another example, be loaded into GPU memory 42.

Compiler 38 may utilize instructions such as a per-instance preamble start to mark the beginning of the per-instance shader preamble and a preamble end instruction to mark the end of the per-instance shader preamble.

Graphics driver 40 or compiler 38 may initialize state registers (particularly driver-programmed state registers), general purpose registers 26, or uGPRs 27 on GPU 14. In one example, graphics driver 40 may initialize one or more state registers on GPU 14 with data about (i) the number of uniforms in constant RAM for the particular instance or the footprint, or size, of the memory needed (in e.g., kilobytes) for the instance specific uniforms and/or (ii) the maximum number of waves of instances that can fit into the constant RAM allocated. Graphics driver 40 may also store an instance's memory offset (e.g., address) in constant RAM in GPR 26 or uGPR 27.

Shader core 24 specific hardware states also may be initialized by graphics driver 40 or compiler 38. In one example, these states (stored in state registers) may include (i) an instance offset for a wrap-around ring buffer in constant memory 44 (or GPU memory 42), (ii) the instance offset (e.g., address) of the current instance in constant memory 44 (or GPU memory 42), (iii) a flag for each wave (up to the maximum number of waves) denoting whether that particular wave is the first wave of the instance to be executed, and (iv) a flag denoting the per-instance shader preamble has completed execution.

Shader core 24 may be configured to execute shader code for an instance. The shader core 24 may have access to data contained in GPRs 26, uGPRs 27, constant memory 44, and/or state registers. GPRs 26, uGPRs 27, constant memory 44, and/or state registers may contain state information from graphics driver 40 or compiler 38 discussed above. Shader core 24 may also have access to context (e.g. hardware state) information. The context information may contain data retrieved from graphics driver 40 or compiler 38 discussed above.

When a new instance is initialized by graphics driver 40, a new instance event may be passed to shader core 24 from a high level sequencer (HLSQ), which may send pixels to shader cores 24, prior to launching any waves of the instance. The HLSQ may pass the new instance event to shader core 24. The new instance event may initialize state variables for shader core 24. Initializing state variables may include initializing one or more of: a flag denoting the per-instance shader preamble has completed execution to false, a current instance offset to the value (e.g., address) of the instance head of the wrap-around ring buffer, incrementing the value (e.g., address) of the instance head of the wrap-around ring buffer by the number of uniforms to be loaded into constant memory 44 by a load unit. Where the incremented value of the instance head would become greater than size allocated to constant RAM for the instance (e.g., the size of the wrap around ring buffer), the instance head may be set to 0 (i.e. an address offset corresponding to the beginning of the wrap-around ring buffer).

When shader core 24 is ready to execute a wave of a particular instance, the shader core 24 determines whether the wave is the first wave of the instance. The shader core may make the determination by accessing the first wave flag corresponding to the current wave. If the wave is the first wave of the instance, shader core 24 determines whether to execute the per-instance shader preamble. Shader core 24 may utilize a flag denoting that the preamble has (or has not) been executed to make such a determination.

In some examples, the shader preamble may be executed by a scalar processor (e.g., a single arithmetic logic unit (ALU)) on shader core 24. In other examples, the shader preamble may be executed by the parallel processing elements of shader core 24 (sometimes called a vector processor).

When shader core 24 determines that the per-instance shader preamble has not been executed, the per-instance shader preamble is executed by the parallel processing elements (vector processor) within shader core 24 or the scalar processor within shader core 24. Execution of the per-instance shader preamble by shader core 24 may include loading all or substantially all uniforms into constant memory 44 (or in another example GPU memory 42) from UBO 46. At the completion of the execution of the per-instance shader preamble, the flag denoting that the preamble has (or has not) been executed is set to a state denoting that the preamble has been executed. Once the flag is set denoting flag denoting the per-instance shader preamble been executed, shader core 24 may instruct (via, e.g., a "wake up" instruction) all waves waiting on the execution of the per-instance shader preamble to begin (or continue) executing the main shader instructions.

When shader core 24 determines that the per-instance shader preamble has been executed, the per-instance shader preamble instructions may be skipped (via, e.g., a branch instruction of a program counter) and the main shader code portion is executed by shader core 24. In executing the main shader code portion, shader core 24 may access uniforms via an instance offset stored in GPR 26 or uGPR 27. The instance offset may be an offset address within the wrap-around ring buffer. The shader core 24 may execute shader code to read a value from constant RAM (e.g., constant memory 44 or GPU memory 42) via an address derived from the instance offset (stored, e.g., in GPR 26) and a uniform offset value for the particular uniform.

The wrap-around ring buffer may hold uniforms for multiple instances. Each instance may have an offset in the ring buffer. Two indexes may be used to retrieve a particular uniform: instance offset and uniform index. The instance offset may be stored in uGPR 27 and may be used to retrieve the offset of the instance in the ring buffer and the uniform index may be used to find the particular uniform inside the instance's uniform segment starting from the offset. The offset may be stored in a uGPR for the main shader to use.

FIG. 3 is a conceptual diagram showing a set of instructions 37 that include per-instance shader preamble code block 39. In this example, per-instance shader preamble code block 39 comprises pseudocode for a per-instance shader preamble start instruction (per_instance_preamble_start) called shader code and ends with an end per-instance shader preamble instruction (end_preamble). Shown within per-instance shader preamble code block 39 is a loop that loads constants (via instruction "ldck") to a destination address (dst) from a source address (src). This may allow constants to be loaded from a UBO 46 to constant RAM (e.g., within constant memory 44 or GPU memory 42). The source address (src) (or a source address offset) within UBO 46 may be calculated based on an instance identifier (instance_id) multiplied by a number of uniforms in an instance (FOOTPRINT) added to the particular uniform identifier (i). The number of uniforms in an instance (FOOTPRINT) may be retrieved from a register (in GPR 26), by shader core 24, loaded by compiler 38 or graphics driver 40 on processor 12. The destination address (dst) may be calculated based on the GPR instance offset (ugpr) added to the particular uniform identifier (i). The instance offset (ugpr) may be retrieved a register (in GPR 26), by shader core 24, loaded by compiler 38 or graphics driver 40. Per-instance shader preamble code block 39 may only be executed a single time per-instance.

Following per-instance shader preamble code block 39 are main shader instructions code block 41. Main shader instructions code block 41 may utilize values that were loaded from UBO 46 to constant RAM (e.g. constant memory 44 or GPU memory 42). Main shader instructions code block 41 includes a read instruction to read from constant RAM (constantRAM[ ]) the offset-th uniform stored for this particular instance (with the instance address offset (ugpr), executed by shader core 24 and loaded from a uniform GPR 27 by constant memory 44 or GPU memory 42.

Figure 4:
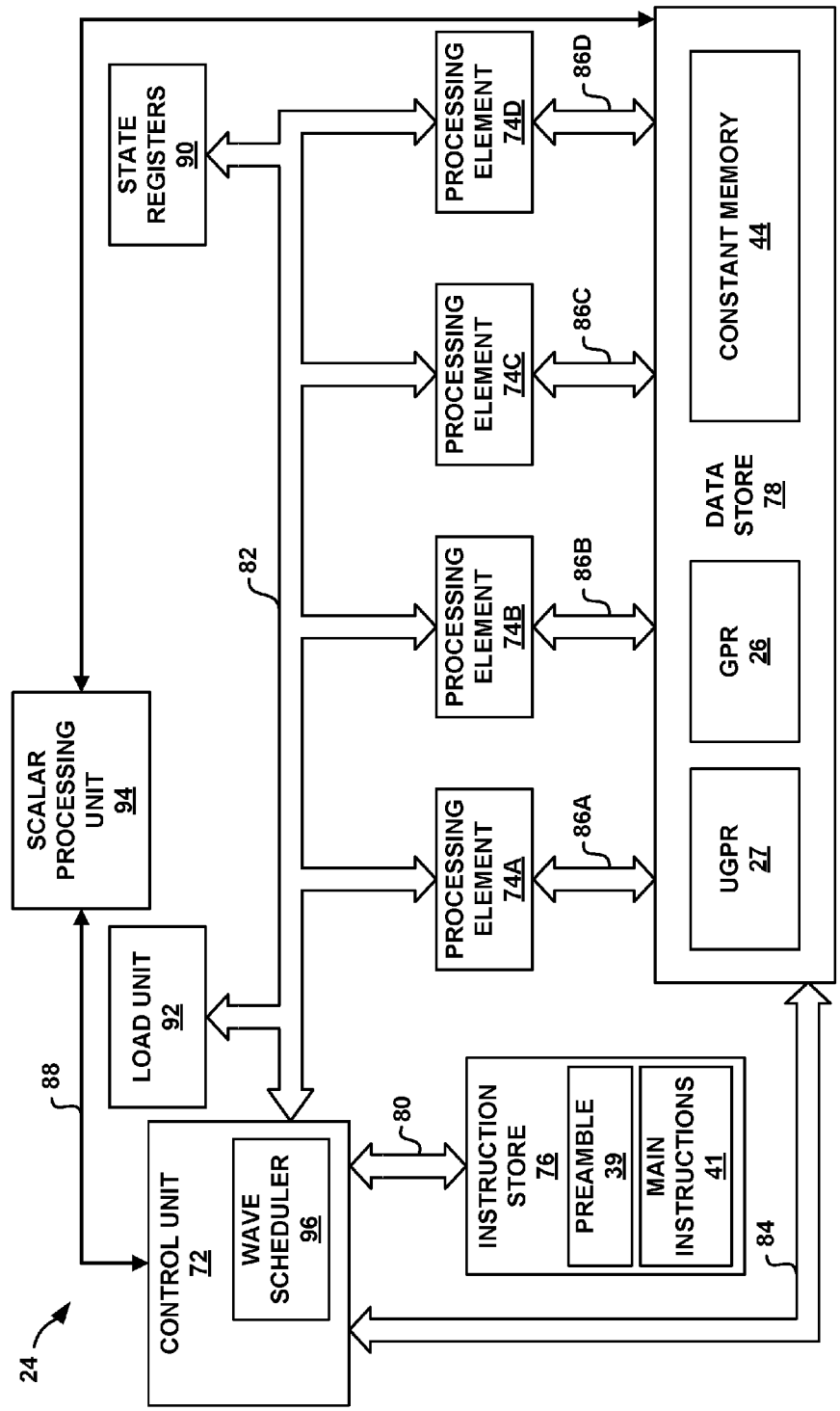
FIG. 4 is a block diagram of an example shader core of the GPU of FIG. 1 in more detail.

FIG. 4 is a block diagram illustrating an example configuration of GPU 14 that may be used to implement the techniques for implementing per-instance shader preamble of this disclosure. GPU 14 is configured to execute instructions for a program in a parallel manner. GPU 14 includes a shader core 24 that includes a control unit 72 (with wave scheduler 96), processing elements 74A-74D (collectively "processing elements 74"), an instruction store 76, a data store 78 (including GPR 26, uGPR 27, and constant memory 44), state registers 90, communication paths 80, 82, 84, 86A-86D. State registers 90 may include non-general purpose registers including, hardware managed internal state registers that remain persistent between waves whereas GPRs 26 may be reset after each wave completes. Communication paths 86A-86D may be referred to collectively as "communication paths 86." In some examples, GPU 14 may be configured as a single-instruction, multiple-data (SIMD) processing system that is configured to execute a plurality of threads of execution for a wave of a program (e.g., shader) using processing elements 74. In such a SIMD system, processing elements 74 may together process a single instruction at a time with respect to different data items. The program may retire after all of the threads associated with the program complete execution.

State registers 90 may include a number of registers and hardware states received from graphics driver 40 or compiler 38 or are determined by GPU 14 based on the hardware or settings of GPU 14. Register reg_instance_region_start may store the offset of the instance region the in the constant memory 44 which may also contain a non-instance region (for example, in an 11-bit vec4 (i.e., a vector that may hold four values) based register with a value of up to 2047). Register reg_instance_footprint may store a value that denotes the number of uniforms in the constant memory 44 and may be received from graphics driver 40 or compiler 38 (for example, in a 8-bit vec4 register with a value of up to 256 (or 4 KB)). Register reg_instance_ram_size may store a value denoting the memory size of all the uniforms for the instance to be stored in constant memory 44 and/or currently stored in uniform buffer object 46 (for example, in a 12-bit vec4 based register with a value up to 2048 (or 32 KB)). Register reg_max_waves_by_instance may store a value of the number of instances that are able to fit within the allocated space within constant memory 44 (for example, a 5-bit register with a value up to 16) that may be precalculated by graphics driver 40 or compiler 38. Register reg_ugprID_for_instance offset may store the address (or number) of a uniform GPR (such as within GPR 26) that holds the instance's address offset.

State variables may be stored in state registers 90. State variable instance_head may include a 12-bit value to hold a head address offset of a wrap-around ring buffer within constant memory 44. In another example, state variable instance_head may hold a pointer to the head of a linked list within constant memory 44. State variable current_instance_offset may include a 12-bit value to store the current instance offset address in constant memory 44, which may be initialized after a new_instance_event message is passed to the shader core 24. State variable first_wave[ ] are a variable number (up to the number stored in reg_max_waves_by_instance, for example, 16) of 1-bit flags set at wave creation to determine which wave will be the first_wave of the instance. When the flag value is set to true, the corresponding wave will be executed first, the other waves are set to false. State variable preamble_done is a 1-bit flag to denote that the per-instance shader preamble has been executed and threads/waves may begin to execute.

Control unit 72 is communicatively coupled to instruction store 76 via communication path 80, to processing elements 74 via communication path 82, and to data store 78 via communication path 84. Control unit 72 may use communication path 80 to send read instructions to instruction store 76. A read instruction may specify an instruction address in instruction store 76 from which an instruction should be retrieved. Control unit 72 may receive one or more program instructions from instruction store 76 in response to sending the read instruction. Control unit 72 may read instructions from per-instance shader preamble code block 39 and main shader instructions code block 41 from instruction store 76. Control unit 72 may determine whether the per-instance shader preamble has been previously executed (via a flag stored in state registers 90 of data store 78).

Waves may be created inside shader core 24 when wave scheduler 96 in control unit 72 determines that the resources that are needed to process a wave are available.

When control unit 72 receives a notification from graphics driver 40 or compiler 38 that there is a new draw call event (i.e., a new_context event is sent), control unit 72 will modify the wave capacity with register reg_max_waves_by_instances. The control unit may also set the instance_head to 0. In another example, the control unit may set the instance_head to the value of reg_instance_region_start.

Graphics driver 40 or compiler 38 may alert, via a command processor or primitive controller, control unit 72 that a new instance has been initialized and constant memory 44 should be allocated for the instance. This alert may utilize a new_instance_event event sent from a HLSQ to control unit 72. Upon receiving this alert control unit 72 may initialize the preamble_done flag to false, initialize the current_instance_offset state variable to the value of the instance_head state variable, increment the instance_head state variable by the reg_instance_footprint (to move from a memory allocated to a previous instance to the new instance), and set the instance_head to 0 where the instance_head+reg_instance_footprint>=reg_instance_ram_size (i.e., where incrementing the instance head would be greater than or equal to the total allocated instance space in memory, treating that portion of memory as a wrap-around ring buffer).

Wave creation may occur when a wave scheduler 96 in control unit 72 determines that the resources that a wave will need are available. Wave creation may occur in shader core 24 at one stage of the GPU pipeline after the driver sends a draw command to the GPU. At wave creation, i.e., when wave scheduler 96 within control unit 72 generates the wave_creation event and control unit 72 initializes one or more non-driver-programmed state registers 90, uniform GPR 27 to hold the instance's offset (which may be determined by looking up the value of the register reg_ugprID_for_instance_offset) may be set with the current instance offset (state variable current_instance_offset). The uGPR 27 holding the current instance offset may be needed between waves of execution of the same shader program because values stored in GPR 26 are reset between waves. If the new wave is the first wave of the instance, control unit 72 may set the first_wave flag for the new wave to true. Otherwise control unit 72 may set the first_wave flag to false.

Control unit 72 may use communication path 82 to provide instructions to processing elements 74, and in some examples, to receive data from processing elements 74, e.g., the result of a comparison instruction for evaluating a branch condition. In some examples, control unit 72 may use communication path 84 to retrieve data items values from data store 78, e.g., to determine a branch condition. Although FIG. 4 illustrates GPU 14 as including a communication path 84, in other examples, GPU 14 may not include a communication path 84.

Load unit 92 of shader core 24 may load the constants into constant memory 44. Instructions to the load unit 92 of shader core 24 may be found within the per-instance shader preamble code block 39 and may allow constants to be loaded from system memory 16 to on-chip (e.g., GPU) constant memory 44. Constant values may originally be stored in constant buffers in system memory 16. Load unit 92 may load, via instructions from control unit 72, compiler 38, and/or graphics driver 40, the constant values from the constant buffers in system memory 16 to constant memory 44, uGPR 27, or GPR 26. Load unit 92 may be configured to load constants in uGPR 27 if space allocated in constant memory 44 is full.

Each of processing elements 74 may be configured to process instructions for the program stored in instruction store 76. In some examples, each of processing elements 74 may be configured to perform the same set of operations. For example, each of processing elements 74 may implement the same instruction set architecture (ISA). In additional examples, each of processing elements 74 may be an arithmetic logic unit (ALU). In further examples, GPU 14 may be configured as a vector processor, and each of processing elements 74 may be a processing element within the vector processor. In additional examples, GPU 14 may be a SIMD execution unit, and each of processing elements 74 may be a SIMD processing element within the SIMD execution unit.

The operations performed by processing elements 74 may include arithmetic operations, logic operations, comparison operations, etc. Arithmetic operations may include operations such as, e.g., an addition operation, a subtraction operation, a multiplication operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 78.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Each of processing elements 74A-74D may be communicatively coupled to data store 78 (including access to state registers 90, GPR 26, and constant memory 44) via a respective communication path 86A-86D. Processing elements 74 may be configured to retrieve data from data store 78 and store data to data store 78 via communication paths 86. The data retrieved from data store 78 may, in some examples, be operands for the operations performed by processing elements 74. The data stored to data store 78 may, in some examples, be the result of an operation performed by processing elements 74.

Instruction store 76 is configured to store a program for execution by GPU 14. The program may be stored as a sequence of instructions. These instructions may include per-instance shader preamble code block 39 and main shader instructions code block 41. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 14. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 14. Although instruction store 76 is illustrated as being within GPU 14, in other examples, instruction store 76 may be external to GPU 14.

Data store 78 is configured to store data items used by processing elements 74. In some examples, data store 78 may comprise a plurality of registers (such as in GPR 26 or uGPR 27), each register being configured to store a respective data item within a plurality of data items operated on GPU 14. Data store 78 may be coupled to one or more communication paths (not shown) that are configured to transfer data between the registers in data store 78 and a memory (such as constant memory 44) or cache (not shown). State registers 90 (or alternatively, data store 78) may store a number of flags and state variables used by control unit 72 and processing elements 74.

Although FIG. 4 illustrates a single data store 78 for storing data used by processing elements 74, in other examples, GPU 14 may include separate, dedicated data stores for each of processing elements 74. GPU 14 illustrates four processing elements 74 for exemplary purposes. In other examples, GPU 14 may have many more processing elements in the same or a different configuration.

Control unit 72 is configured to control GPU 14 to execute instructions for a program stored in instruction store 76. For each instruction or set of instructions of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 14 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing elements 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82. In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74.

Control unit 72 may execute a plurality of threads of execution for a program using processing elements 74. A plurality of threads to be executed in parallel is sometimes called a wave or warp. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items. Processing elements 74 may execute main shader instructions code block 41. Processing elements 74 may execute per-instance shader preamble code block 39. In one example, per-instance shader preamble code block 39 and main shader instructions code block 41 are stored concurrently (without any delimiter) in instruction store 76. In another example, shader core 24 may utilize a separate scalar processing unit 94, via communications path 88, to execute the per-instance shader preamble code block 39.

Scalar processing unit 94 may be any type of processor that is configured to operate on one data item at a time. Like processing elements 74, scalar processing unit 94 may include an ALU. The operations performed by scalar processing unit 94 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 78.

Per-wave instruction scheduler 96 may create and manage waves including assigning wave identifiers, allocating GPRs to processing elements 74, manage wave state transitions, select a wave to run from multiple waves, and update program counters of the wave.

At wave execution, control unit 72 and/or per-wave instruction scheduler 96 may schedule processing elements 74 to each process shader code stored in instruction store 76. When shader code includes a per-instance shader preamble code block 39, the processing element 74 (or control unit 72 or per-wave instruction scheduler 96) will execute a per_instance_preamble_start or branch_if_not_first_wave instruction. The per_instance_preamble_start instruction will check to see if the wave identifier (wave_id) of the current wave is the first wave of the instance (by, e.g., checking the first_wave[wave_id] state variable). If the current wave is the first_wave of the instance, instruction scheduler 96 will increment a program counter to the next line to execute the per-instance shader preamble, otherwise the program counter will be incremented to the end of the per-instance shader preamble code block 39 (e.g., to a main shader instructions code block 41 of the shader program) and to execute a wait_until_instance_preamble_done instruction which will wait to execute the main shader instructions code block 41 only after the preamble_done flag is set, i.e., after the per-instance shader preamble has completed execution. In one example, per-wave instruction scheduler 96 will schedule scalar processing unit 94 to execute the per-instance shader preamble. In another example the per-instance shader preamble is executed by one of processing elements 74.

Upon execution of the main shader instructions code block 41, uniforms may be retrieved from a wrap-around ring buffer in constant memory 44. The address in constant memory 44 may be obtained by a uGPR value (stored in uGPR 27) with the current instance offset (ugpr) and an offset for the particular uniform (offset).

Figure 5:
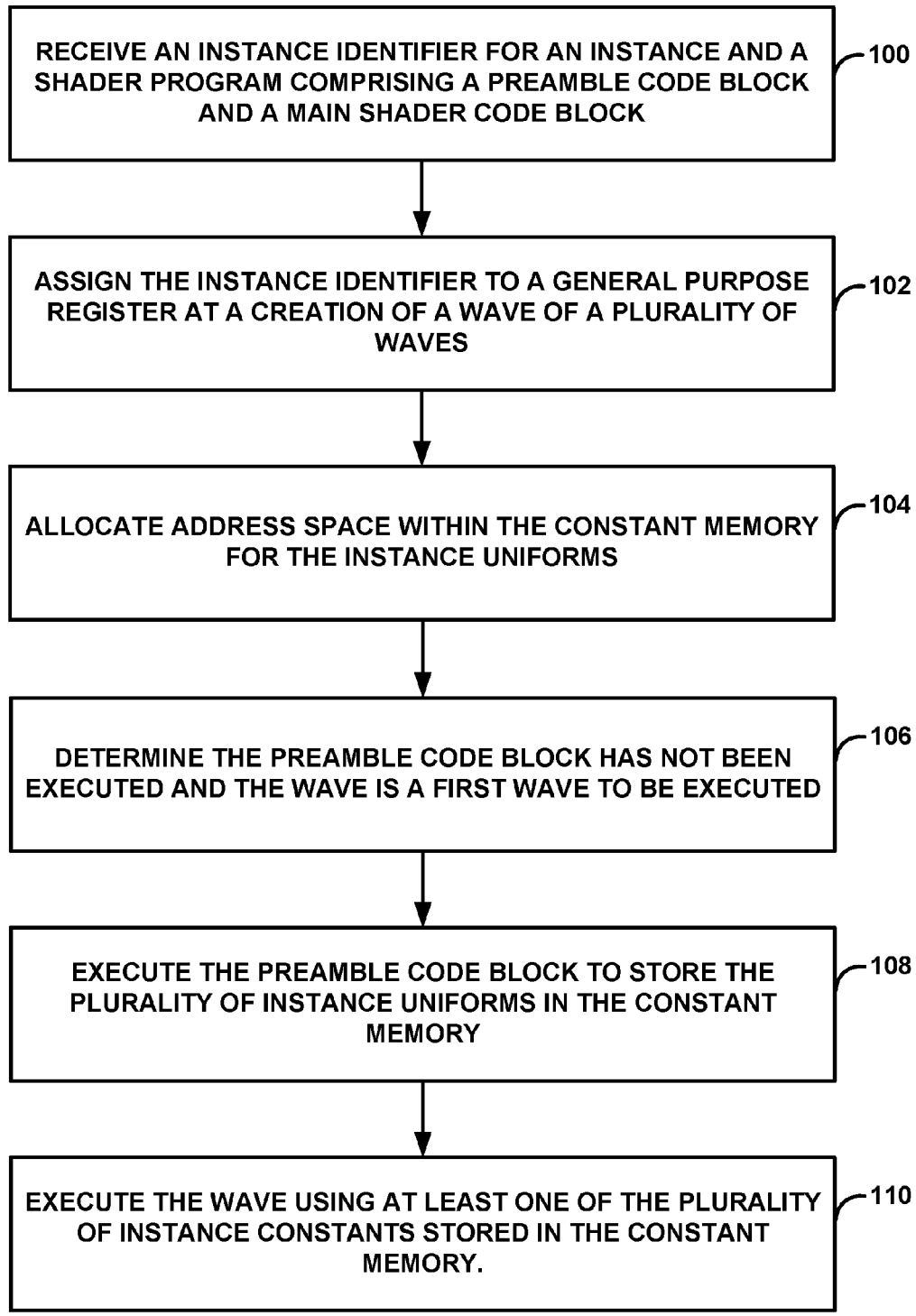
FIG. 5 is a flowchart illustrating an example technique of processing data in a GPU.

FIG. 5 is a flowchart illustrating an example method according to the techniques of this disclosure. The techniques of FIG. 5 may be implemented by one or more of GPU 14 and/or processor 12 (see FIGS. 1 and 2).

In one example of the disclosure, GPU 14 may be configured to receive from a shader compiler an instance identifier for an instance (i.e., a geometry instance, a mesh instance, or an object instance) and a shader program comprising a per-instance shader preamble code block 39 and a main shader instructions code block 41 (100). The per-instance shader preamble code block 39 may be executable to store a plurality of instance uniforms in a constant memory 44. Constant memory 44 may contain a wrap-around ring buffer to store the instance uniforms. In another example, constant memory 44 may also contain a linked list to store the instance uniforms.

GPU 14 may be further configured to assign the instance identifier to a general purpose register at a creation of a wave of a plurality of waves (102). GPU 14 may be further configured to allocate address space within the constant memory 44 for the instance uniforms (104). GPU 14 may be further configured to per-instance shader preamble code block 39 has not been executed and that the wave is a first wave of the instance to be executed (106). The determination that the per-instance shader preamble code block 39 has not been executed may be based on the value of a flag (e.g., preamble_done flag having the value of false). The determination that the wave is the first wave of the instance to be executed may be based on the value of a flag (e.g., first_wave[wave_id] flag having the value of true).

GPU 14 may be further configured, based, at least in part, on determining the per-instance shader preamble code block 39 has not been executed and the wave is the first wave of the instance to be executed, execute, the per-instance shader preamble code block 39 to store the plurality of instance uniforms in the constant memory 44 (108). Storage of the plurality of instance uniforms may include determining a source address of an instance uniform of the plurality of instance uniforms in a uniform buffer object 46 based on the instance identifier and a number uniforms in the instance by the GPU 14. Furthermore, storage of the plurality of instance uniforms may include determining a destination address of the instance uniform of the plurality of instance uniforms in the constant memory by the GPU 14. Storage of the plurality of instance uniforms may also include based, at least in part, on the determined source address and the determined destination address, storing the instance uniform of the plurality of instance uniforms by the GPU 14.

GPU 14 may be further configured to, based, at least in part, on executing the per-instance shader preamble code block 39, execute the wave of the plurality of waves using at least one of the plurality of instance constants stored in the constant memory 44 (110).

At the creation of a second wave, the GPU 14 may assign the instance identifier to the general purpose register at a creation of a second wave of the plurality of waves. This assignment may occur because general purpose registers (such as GPR 26) may be cleared between waves. GPU 14 may determine that the second wave is not the first wave of the instance. Based, at least in part, on the determination that the second wave is not the first wave of the instance and determining the preamble block has not been executed, GPU 14 may be configured to wait for the preamble block to complete execution. Based, at least in part, on the determination that the second wave is not the first wave of the instance and the determination that the preamble block has been executed, GPU 14 may be configured to execute the second wave of the plurality of waves of the instance using instance constants stored in the constant memory.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of operating a graphic processing unit (GPU), the method comprising:
receiving, by the GPU from a shader compiler, an instance identifier for an instance and a shader program, the shader program comprising a preamble code block and a main shader code block, the preamble code block being executable to store a plurality of instance uniforms in a constant memory;
assigning, by the GPU, the instance identifier to a general purpose register at a creation of a wave of a plurality of waves;
allocating, by the GPU, address space within the constant memory for the plurality of instance uniforms;
determining, by the GPU, the preamble code block has not been executed and the wave is a first wave of the instance to be executed;
based, at least in part, on determining the preamble code block has not been executed and the wave is the first wave to be executed, executing, by the GPU, the preamble code block to store the plurality of instance uniforms in the constant memory; and
based, at least in part, on executing the preamble code block, executing, by the GPU, the main shader code block for the wave of the plurality of waves using at least one of the plurality of instance constants stored in the constant memory.

2. The method of claim 1, further comprising:
assigning, by the GPU, the instance identifier to the general purpose register at a creation of a second wave of the plurality of waves.

3. The method of claim 2, further comprising:
determining, by the GPU, the second wave is not the first wave;
based, at least in part, on determining the second wave is not the first wave and determining the preamble block has not been executed, waiting for the preamble block to complete execution before executing the main shader code block for the second wave.

4. The method of claim 2, further comprising:
determining, by the GPU, the second wave is not the first wave;
based, at least in part, on determining the second wave is not the first wave and determining the preamble block has been executed, executing, by the GPU, the main shader code block for the second wave of the plurality of waves using instance constants stored in the constant memory.

5. The method of claim 1, wherein, the constant memory comprises a wrap-around ring buffer and storage of the instance uniforms in the constant memory comprises storage of the instance uniforms in the wrap-around ring buffer.

6. The method of claim 5, further comprising storing, in a uniform general purpose register, an instance offset in the wrap-around ring buffer, the instance offset configured to locate the plurality of instance uniforms in the constant memory of the instance.

7. The method of claim 1, wherein executing, by the GPU, the preamble code block to store the plurality instance uniforms in the constant memory further comprises:
determining a source address of an instance uniform of the plurality of instance uniforms in a uniform buffer object based on the instance identifier and a number uniforms in the instance;
determining a destination address of the instance uniform of the plurality of instance uniforms in the constant memory;
based, at least in part, on the determined source address and the determined destination address, storing the instance uniform of the plurality of instance uniforms.

8. The method of claim 1, wherein, determining, by the GPU, the preamble code block has not been executed is based on the value of a flag being false.

9. The method of claim 1, wherein, executing the preamble code block comprises:
executing a per_instance_preamble_start instruction configured to delineate a start of the preamble code block; and
executing a per_instance_preamble_end instruction configured to delineate an end of the preamble code block.

10. A device for processing data, the device comprising:
a graphics processing unit (GPU), the GPU comprising a constant memory and a shader core, the shader core comprising a control unit, a plurality of processing elements, and a general purpose register (GPR), wherein the control unit is configured to:
receive, from a shader compiler, an instance identifier for an instance and a shader program, the shader program comprising a preamble code block and a main shader code block, the preamble code block being executable to store a plurality of instance uniforms in the constant memory;
assign the instance identifier to the GPR at a creation of a wave of a plurality of waves;
allocate address space within the constant memory for the plurality of instance uniforms;
determine the preamble code block has not been executed and the wave is a first wave of the instance to be executed;
based, at least in part, on the determination that the preamble code block has not been executed and the wave is the first wave to be executed, direct at least one of the plurality of processing elements to execute the preamble code block to store the plurality of instance uniforms in the constant memory; and
based, at least in part, on the execution of the preamble code block, direct at least one of the plurality of processing elements to execute the main shader code block for the wave of the plurality of waves using at least one of the plurality of instance constants stored in the constant memory.

11. The device of claim 10, wherein the control unit is further configured to:
assign the instance identifier to the general purpose register at a creation of a second wave of the plurality of waves.

12. The device of claim 11, wherein the control unit is further configured to:
determine the second wave is not the first wave;
based, at least in part, on determining the second wave is not the first wave and determining the preamble block has not been executed, wait for the preamble block to complete execution before execution of the main shader code block for the second wave.

13. The device of claim 11, wherein the control unit is further configured to:
determine the second wave is not the first wave;
based, at least in part, on determining the second wave is not the first wave and determining the preamble block has been executed, execute the main shader code block for the second wave of the plurality of waves using instance constants stored in the constant memory.

14. The device of claim 10 wherein, the constant memory comprises a wrap-around ring buffer and storage of the instance uniforms in the constant memory comprises storage of the instance uniforms in the wrap-around ring buffer.

15. The device of claim 14, wherein:
the shader core further comprises a uniform general purpose register, and the control unit is further configured store an instance offset in the wrap-around ring buffer, the instance offset configured to locate the plurality of instance uniforms in the constant memory of the instance.

16. The device of claim 10, wherein the control unit configured to execute the preamble code block to store the plurality instance uniforms in the constant memory further comprises the control unit configured to:
determine a source address of an instance uniform of the plurality of instance uniforms in a uniform buffer object based on the instance identifier and a number uniforms in the instance;
determine a destination address of the instance uniform of the plurality of instance uniforms in the constant memory;
based, at least in part, on the determined source address and the determined destination address, store the instance uniform of the plurality of instance uniforms.

17. The device of claim 10, wherein the control unit configured to determine the preamble code block has not been executed is based on the value of a flag being false.

18. The device of claim 10, wherein, execution of the preamble code block comprises:
execution of a per_instance_preamble_start instruction configured to delineate a start of the preamble code block; and
execution of a per_instance_preamble_end instruction configured to delineate an end of the preamble code block.

19. An apparatus configured to operate a graphic processing unit (GPU), the apparatus comprising:
means for receiving, from a shader compiler, an instance identifier for an instance and a shader program, the shader program comprising a preamble code block and a main shader code block, the preamble code block being executable to store a plurality of instance uniforms in a constant memory;
means for assigning the instance identifier to a general purpose register at a creation of a wave of a plurality of waves;
means for allocating address space within the constant memory for the plurality of instance uniforms;
means for determining the preamble code block has not been executed and the wave is a first wave of the instance to be executed;
means for executing the preamble code block to store the plurality of instance uniforms in the constant memory based, at least in part, on determining the preamble code block has not been executed and the wave is the first wave to be executed; and
means for executing the main shader code block for the wave of the plurality of waves using at least one of the plurality of instance constants stored in the constant memory based, at least in part, on the executing the preamble code block.

20. The apparatus of claim 19, further comprising:
means for assigning the instance identifier to the general purpose register at a creation of a second wave of the plurality of waves.

21. The apparatus of claim 20, further comprising:
means for determining the second wave is not the first wave;

means for waiting for the preamble block to complete execution before executing the main shader code block for the second wave based, at least in part, on determining the second wave is not the first wave and determining the preamble block has not been executed.

22. The apparatus of claim 20, further comprising:
means for determining the second wave is not the first wave;
means for executing the main shader code block for the second wave of the plurality of waves using instance constants stored in the constant memory based, at least in part, on determining the second wave is not the first wave and determining the preamble block has been executed.

23. The apparatus of claim 19, wherein, the constant memory comprises a wrap-around ring buffer and storage of the instance uniforms in the constant memory comprises storage of the instance uniforms in the wrap-around ring buffer.

24. The apparatus of claim 19, wherein the means for executing the preamble code block to store the plurality instance uniforms in the constant memory comprises:
means for determining a source address of an instance uniform of the plurality of instance uniforms in a uniform buffer object based on the instance identifier and a number uniforms in the instance;
means for determining a destination address of the instance uniform of the plurality of instance uniforms in the constant memory;
means for storing the instance uniform of the plurality of instance uniforms based, at least in part, on the determined source address and the determined destination address.

25. A non-transitory computer-readable storage medium including instructions stored thereon that, when executed, cause at least one processor of to:
receive, from a shader compiler, an instance identifier for an instance and a shader program, the shader program comprising a preamble code block and a main shader code block, the preamble code block being executable to store a plurality of instance uniforms in a constant memory;
assign the instance identifier to a general purpose register (GPR) at a creation of a wave of a plurality of waves;
allocate address space within the constant memory for the plurality of instance uniforms;
determine the preamble code block has not been executed and the wave is a first wave of the instance to be executed;
based, at least in part, on the determination that the preamble code block has not been executed and the wave is the first wave to be executed, direct at least one of the plurality of processing elements to execute the preamble code block to store the plurality of instance uniforms in the constant memory; and
based, at least in part, on the execution of the preamble code block, direct at least one of the plurality of processing elements to execute the main shader code block for the wave of the plurality of waves using at least one of the plurality of instance constants stored in the constant memory.

26. The non-transitory computer-readable storage medium of claim 25, wherein the instructions, when executed, further cause at least one processor of to:
assign the instance identifier to the general purpose register at a creation of a second wave of the plurality of waves.

27. The non-transitory computer-readable storage medium of claim 25, wherein the instructions, when executed, further cause at least one processor of to:
- determine the second wave is not the first wave;
- based, at least in part, on determining the second wave is not the first wave and determining the preamble block has not been executed, wait for the preamble block to complete execution before execution of the main shader code block for the second wave.

28. The non-transitory computer-readable storage medium of claim 25, wherein the instructions, when executed, further cause at least one processor of to:
- determine the second wave is not the first wave;
- based, at least in part, on determining the second wave is not the first wave and determining the preamble block has been executed, execute the main shader code block for the second wave of the plurality of waves using instance constants stored in the constant memory.

29. The non-transitory computer-readable storage medium of claim 25, wherein the instructions, which when executed, cause at least one processor to execute the preamble code block to store the plurality instance uniforms in the constant memory comprise instructions, when executed, cause at least one processor to:
- determine a source address of an instance uniform of the plurality of instance uniforms in a uniform buffer object based on the instance identifier and a number uniforms in the instance;
- determine a destination address of the instance uniform of the plurality of instance uniforms in the constant memory;
- based, at least in part, on the determined source address and the determined destination address, store the instance uniform of the plurality of instance uniforms.

30. The non-transitory computer-readable storage medium of claim 25, wherein the instructions, when executed, cause at least one processor to determine the preamble code block has not been executed is based on the value of a flag being false.

* * * * *

UNITED STATES PATENT AND TRADEMARK OFFICE
CERTIFICATE OF CORRECTION

PATENT NO. : 9,799,094 B1
APPLICATION NO. : 15/162198
DATED : October 24, 2017
INVENTOR(S) : Lin Chen et al.

Page 1 of 1

It is certified that error appears in the above-identified patent and that said Letters Patent is hereby corrected as shown below:

In the Claims

Column 21, Line 26 (Claim 1): Replace "instance constants" with --instance uniforms--

Column 22, Line 43 (Claim 10): Replace "instance constants" with --instance uniforms--

Column 23, Line 58 (Claim 19): Replace "instance constants" with --instance uniforms--

Column 24, Line 60 (Claim 25): Replace "instance constants" with --instance uniforms--

Signed and Sealed this
Eighteenth Day of November, 2025

John A. Squires
*Director of the United States Patent and Trademark Office*